(12) United States Patent
Hall et al.

(10) Patent No.: US 7,242,493 B2
(45) Date of Patent: Jul. 10, 2007

(54) TRANSMITTING MINIATURE VERSIONS OF FILES TO RECEIVING DEVICES

(75) Inventors: John M. Hall, Boise, ID (US); Gerald A. Loyd, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1206 days.

(21) Appl. No.: 10/196,710

(22) Filed: Jul. 15, 2002

(65) Prior Publication Data

US 2004/0008367 A1     Jan. 15, 2004

(51) Int. Cl.
G06F 3/12 (2006.01)
G06K 15/00 (2006.01)
G06K 1/00 (2006.01)

(52) U.S. Cl. .................................. 358/1.15; 358/1.18
(58) Field of Classification Search ........ 358/1.1–1.18, 358/523, 538, 540, 403, 462
See application file for complete search history.

(56) References Cited

U.S. PATENT DOCUMENTS 6,188,429 B1 * 2/2001 Martin et al. ............ 348/14.08

2003/0054806 A1 * 3/2003 Ho et al.

FOREIGN PATENT DOCUMENTS

| JP | 2266662 A | 10/1990 |
|----|-----------|---------|
| JP | 2000174803 | 6/2000 |
| JP | 2001358890 | 12/2001 |

* cited by examiner

Primary Examiner—Douglas Q. Tran

(57) ABSTRACT

An image file is created, such as by scanning a document in a digital sending device. A corresponding text file is created, such as by optical character recognition. Both are stored where they are retrievable through use of URLs. Miniaturized versions of both files are created. A message is created including miniaturized versions of the files and URLs addressing the originals. The message is sent to a wireless web-enabled device user. The message recipient can display the miniaturized versions of files and thus determine whether to view the corresponding full versions using the also enclosed URLs.

11 Claims, 3 Drawing Sheets

TRANSMITTING MINIATURE VERSIONS OF FILES TO RECEIVING DEVICES

FIELD OF THE INVENTION

The present invention generally relates to transmission of miniature versions of image and text documents from a sending device to a receiving device.

BACKGROUND OF THE INVENTION

Modern businesses rely on being able to transfer document images from one location to another. With the adoption of Group 3 digital standards in 1980 by the Comité Consultatif International Téléphonique et Télégraphique (CCITT) (or the International Telegraph and Telephone Consultative Committee), facsimile (FAX) devices have become extremely prevalent in offices. Facsimile devices typically operate by scanning a document line by line to detect light and dark areas. These light and dark areas are then converted into binary digits. A representation of these light and dark areas is then transmitted across a telephone line to a receiving unit that in turn uses the received representation to generate dots on paper. The result is a reasonably good copy of the original document. Originally, facsimile printers typically utilized thermal paper imaging. More recently, laser and ink jet printing of incoming facsimile copies has become common. Also, many computer modems support the Group 3 digital standard and thus allow computers to operate both to send and to receive facsimile copies of documents.

Facsimile transmission of copies of documents works reasonably well. However, a number of problems have been identified. One problem that has been identified is that facsimile copies often do not provide the level of image resolution that some applications require. Another problem is that facsimile transmissions typically consume more transmission bandwidth than may be necessary. This is compounded by the problem that, in most cases, facsimile transmissions utilize an entire circuit-switched connection, as contrasted to sharing of circuits as is found in packet-switching solutions.

One solution to these problems that has been found arose naturally from the use in many instances of computers on both ends of facsimile transmissions. On the one end of a connection, a computer emulates a facsimile transmitter, and on the other end, another computer emulates a facsimile receiver. Standard computer scanners can be utilized to scan in documents. Similarly, standard computer printers can be utilized to print out received documents. In between, digital images of the documents are converted to the required Group 3 standard format before transmission and then converted from the Group 3 standard to a standard computer output format before being printed.

One solution is termed "Digital Sending". Digital sending eliminates the conversions from and to the Group 3 standard. Instead, a document is scanned into a standard internal computer image format, such as Portable Document Format (PDF) from Adobe Systems Incorporated, Tagged Image File Format (TIFF), Joint Photographic Experts Group (JPEG) format, Bit-Map (BMP) format from Microsoft Corporation, etc. The document is then transmitted to a receiving system in the specified internal computer image format, where it can be manipulated, stored, or printed, as desired. While a transmission can be over a circuit-switched network, it is more frequently done over a packet-switched network, such as the Internet, or a corporate intranet. Typically, documents are transmitted as e-mail file attachments.

Originally, digital sending mirrored the typical e-mail environment. An e-mail message with one or more attached documents would be sent from one computer to another. However, as the cost of processing power continues to decline, it has become cost effective to utilize commodity processors in some auxiliary or peripheral devices such as printers and scanners. At the same time, these auxiliary devices are frequently being connected directly to networks instead of computers in order to more easily provide sharing of such among multiple computers and computer users. One result of this is that these auxiliary devices can now support functions such as e-mail that previously were limited to computers.

The incorporation of e-mail capabilities within auxiliary devices such as printers and scanners allows these devices to be utilized in digital sending. A scanner can be used to scan a document into a specified format and then to transmit that document as an e-mail attachment to a recipient. Similarly, a printer can receive an e-mail containing a document in a particular format and print it out. Especially useful for digital sending are all-in-one or multifunction devices that provide scanning and printing, and even facsimile transmissions. Some current examples of stand-alone devices capable of digital sending and/or receiving are the 9100C digital sending device and the LaserJet 8150 multifunction device from Hewlett-Packard Company of Palo Alto, Calif.

One problem that remains is that of delivering scanned documents to digital receiving devices that have either limited display area or limited bandwidth. Some examples of these are web-enabled cellular telephones, two-way pagers, and personal data assistants (PDAs). All of these devices have both problems. First, they have very limited display space. It is typically possible to only display a small portion of a scanned page at a time with these wireless, portable, web-enabled digital receiving devices.

Secondly, the wireless networks used to communicate with them typically have very limited bandwidth. One problem with wireless networks today is that scanned documents are typically relatively large. One reason for this is that computer readable image files typically require either bits or vectors to represent their contents. Transmitting a scanned document across a wireless network to a web-enabled digital receiving device can conceivably consume the entire wireless network bandwidth for a substantial period of time.

It would be advantageous to provide a mechanism for a wireless device with limited display area or limited bandwidth to be able to act effectively as a digital receiving device.

SUMMARY OF THE INVENTION

An image file is created. This may be done by scanning a document in a digital sending device into a computer readable image format. A corresponding text file is also created. This is typically done through the use of optical character recognition. Both of these files are stored where they can be retrieved through the use of Uniform Resource Locators (URLs). Miniaturized versions of both of these files are also created.

A message is then created that includes the miniaturized versions of the files plus the URLs addressing the original, full versions of the files. The message is then sent to a wireless web-enabled device. The wireless web-enabled device user can then display the miniaturized versions of the files and determine from such a display whether or not to download and view the corresponding full versions using the URLs also enclosed in the message.

DETAILED DESCRIPTION

Figure 1:
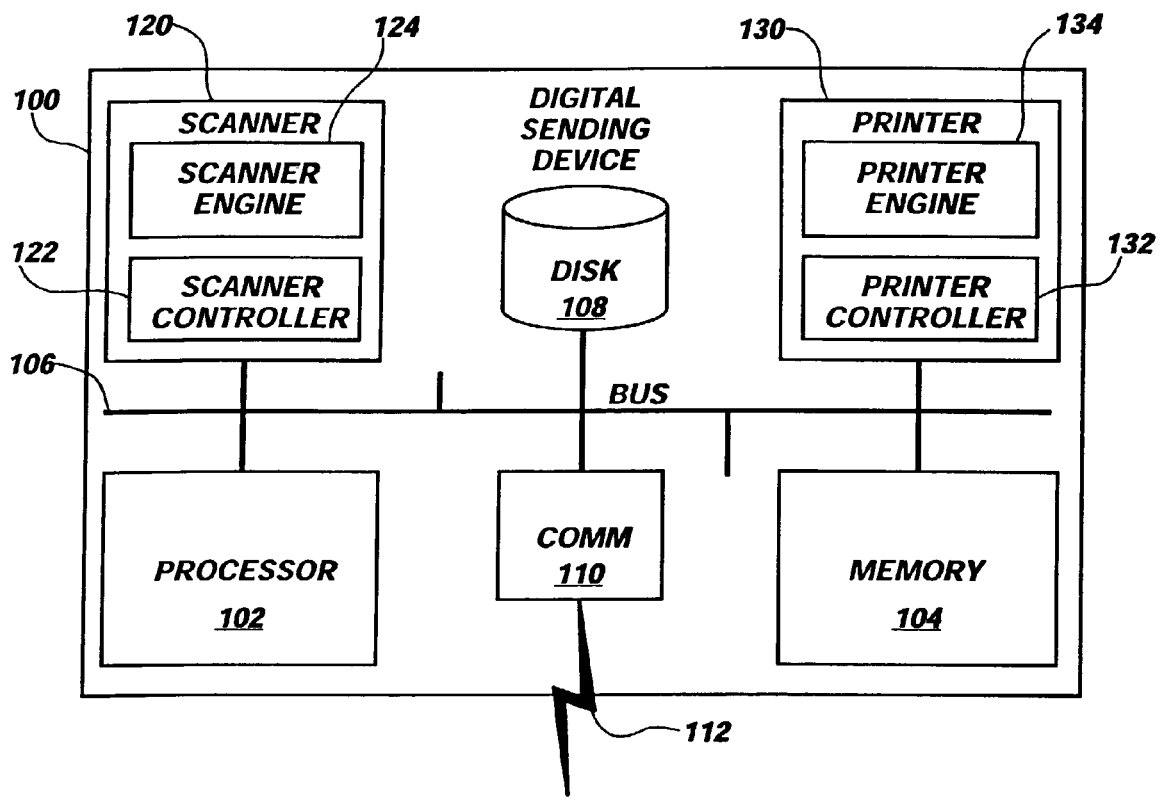
FIG. 1 is a block diagram of an exemplary digital sending device.

FIG. 1 is a block diagram of an exemplary digital sending device 100. The digital sending device 100 preferably comprises: a processor 102, memory 104, scanner components 120, printer components 130, and a communications interface 110, all coupled by a bus 106. Also, alternatively included in the digital sending device 100 and coupled to the other components by the bus 106 is secondary storage 108.

The memory 104 is a relatively high-speed, machine-readable medium and comprises volatile memories, such as DRAM and SRAM, and/or nonvolatile memories, such as ROM, FLASH, EPROM, and EEPROM. Secondary storage 108 includes machine-readable media such as: hard disk drives (or DASD) and disk subsystems, floppy disks, removable hard drives, magnetic tapes, CD-ROM, and/or other computers, possibly connected via a communications line. Computer instructions comprising software such as digital sending device 100 control software can be stored in a computer instruction storage medium such as volatile memory, nonvolatile memory, or secondary storage. Executable versions of computer instructions can be read from a computer readable storage medium such as secondary storage and nonvolatile memory and loaded for execution directly into volatile memory, executed directly out of nonvolatile memory, or stored on the secondary storage prior to loading into volatile memory for execution.

The scanner components 120 comprise scanner control logic 122 and a scanner engine 124. The scanner control logic 122 controls the operation of the scanner engine 124. The printer components 130 comprise printer control logic 132 and a printer engine 134. The printer control logic 132 controls the operation of a printer engine 134. The scanner engine 124 and the printer engine 134 are the electromechanical portions of the scanner components 120 and printer components 130, respectively.

The processor 102 is preferably a commodity processor, such as a MIPS® RISC processor currently utilized by Hewlett-Packard Company in some of its multifunction devices. Alternatively, the processor 102 may be a custom processor. The processor 102 controls operation of the digital sending device 100 through execution of computer instructions fetched from memory 104.

The communications interface 110 provides communications between the digital sending device 100 and other computers and devices. Typically, the communications interface 110 provides an electronic and protocol interface to a communications link 112. In the preferred embodiment, the communications link 112 is to a local area network such as an Ethernet network. However, other types of communications links 112 are also within the scope of the present invention. For example, the communications link 112 may utilize a DB25/Centronics parallel interface to a computer.

The configuration shown in FIG. 1 is illustrative only. Other configurations are also within the scope of this invention. For example, either the printer components 130 or the scanner components 120 may not be present. Also, the printer control logic 132 and the scanner control logic 122 are shown as separate components from the processor 102. However, this is illustrative only. Some or all of the functionality of the printer control logic 132 and the scanner control logic 122 may be implemented as computer instructions executed by the processor 102. Similarly, though the communications interface 110 is shown as a separate component, it may also be implemented utilizing a portion of the cycles of the processor 102.

Figure 2:
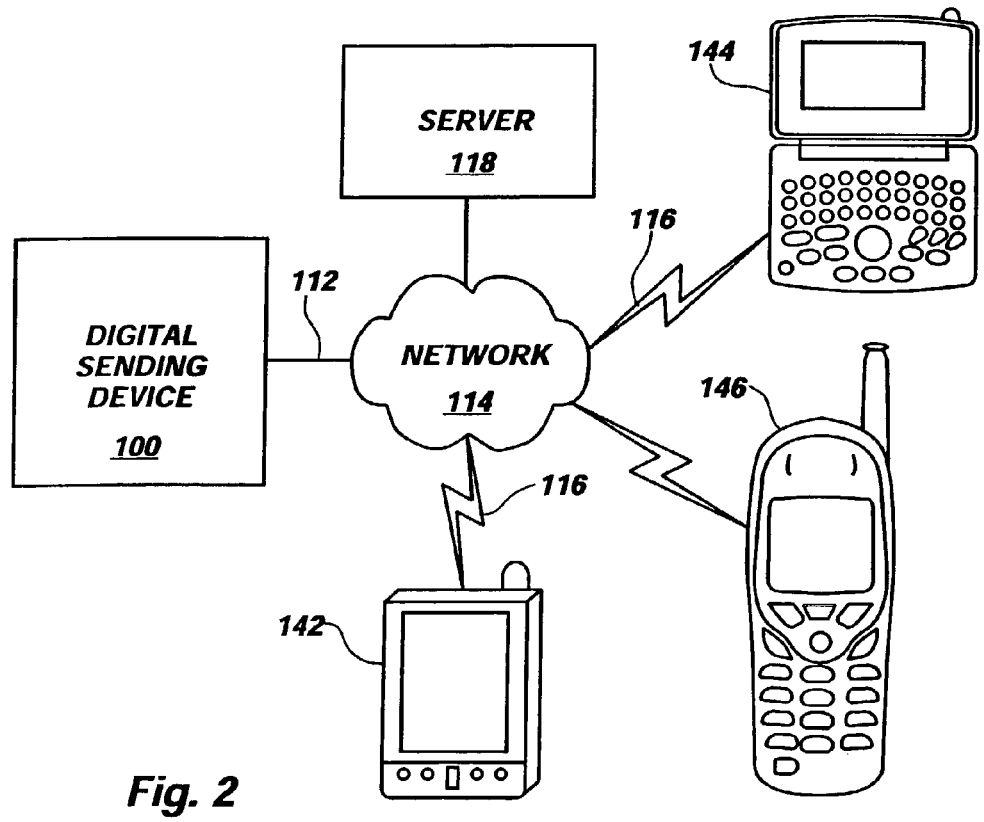
FIG. 2 is a block diagram illustrating a network containing a digital sending device, in accordance with one embodiment of the present invention.

FIG. 2 is a block diagram illustrating a network containing a digital sending device 100, in accordance with one embodiment of the present invention. A digital sending device 100 is coupled via a communications link 112 to a digital network 114. Also coupled to the digital network 114 is a server 118 and a plurality of digital receiving devices, which are the designated recipients of digitally sent documents from the digital sending device 100. The server 118 is typically capable of storing documents until being retrieved by users. In the case of a document sent as an e-mail attachment, the server 118 will typically be an e-mail server. Typically, the digital sending device will transmit a scanned document to the server 118, where it will be stored in a spool until ultimately retrieved by the digital receiving device. However, a scanned document may be directly transmitted to a digital receiving device.

Three types of digital receiving devices are shown in FIG. 2: a Personal Data Assistant (PDA) 142, a two-way pager 144, and a telephone 146. In this embodiment, all of these digital receiving devices are coupled to the network 114 through a wireless network 116. A single wireless network 116 is shown. However, this is illustrative only. Currently, different types of wireless digital receiving devices utilize different types of wireless networks 116. For example, wireless telephones 146 today are typically cellular telephones. However, other types of wireless telephone networks are also within the scope of the present invention. Similarly, two-way pagers 144 typically today utilize specific radio frequencies and protocols. Other types of wireless networks 116 for two-way pagers are also within the scope of the present invention.

The digital receiving devices 142, 144, 146 shown in FIG. 2 are "web enabled" they are capable of requesting and receiving World Wide Web (WWW) pages through the wireless network 116. One current example of a web-enabled cellular telephone 146 available today is the 270c Tri-Mode cellular telephone manufactured by Motorola, Inc. One current example of a web-enabled two-way pager 144 today is a V200 Personal Communicator manufactured by Motorola, Inc. One current example of a web-enabled PDA 142 today is an i705 Handheld available from Palm, Inc. Usable with the i705 Handheld is a Mini Keyboard from Palm, Inc. that provides alphanumeric keys for and can fit over the end of the i705 Handheld.

FIG. 2 shows a single digital network 114 with a single server 118. This is illustrative only. Other configurations are also within the scope of this invention. The single digital network 114 may represent a plurality of actual networks. For example, the digital sending device 100 may contain or be coupled to a wireless data transceiver for transmission of data across a short distance wireless data network such as a Bluetooth network. The digital sending device 100 could then transmit a scanned document to a wireless data hub attached to a physical network such as a corporate Ethernet intranet. The scanned document could then be spooled on a first server on this corporate intranet. The scanned document could then be transmitted across this corporate intranet to an Internet gateway or firewall, where it would then be transmitted across the Internet. It might then cross another Internet gateway or firewall and enter another corporate intranet, to which is coupled a second server to which the scanned document is again spooled. The designated digital receiving devices would then retrieve the scanned document from the second server.

In FIG. 2, a single server 118 is shown. It should be understood that this is illustrative only. In many situations, multiple servers will be utilized. One functionality typically implemented on a server 118 is as an incoming e-mail server, such as a Post Office Protocol (POP) version 3 (POP3) e-mail server. Another functionality typically implemented on a server 118 is as an outgoing e-mail server, such as a Simple Mail Transfer Protocol (SMTP) e-mail server. Alternatively, other types of e-mail, such as proprietary e-mail products, are also within the scope of this invention. Another type of functionality typically implemented on a server 118 is as a WWW server.

Figure 3:
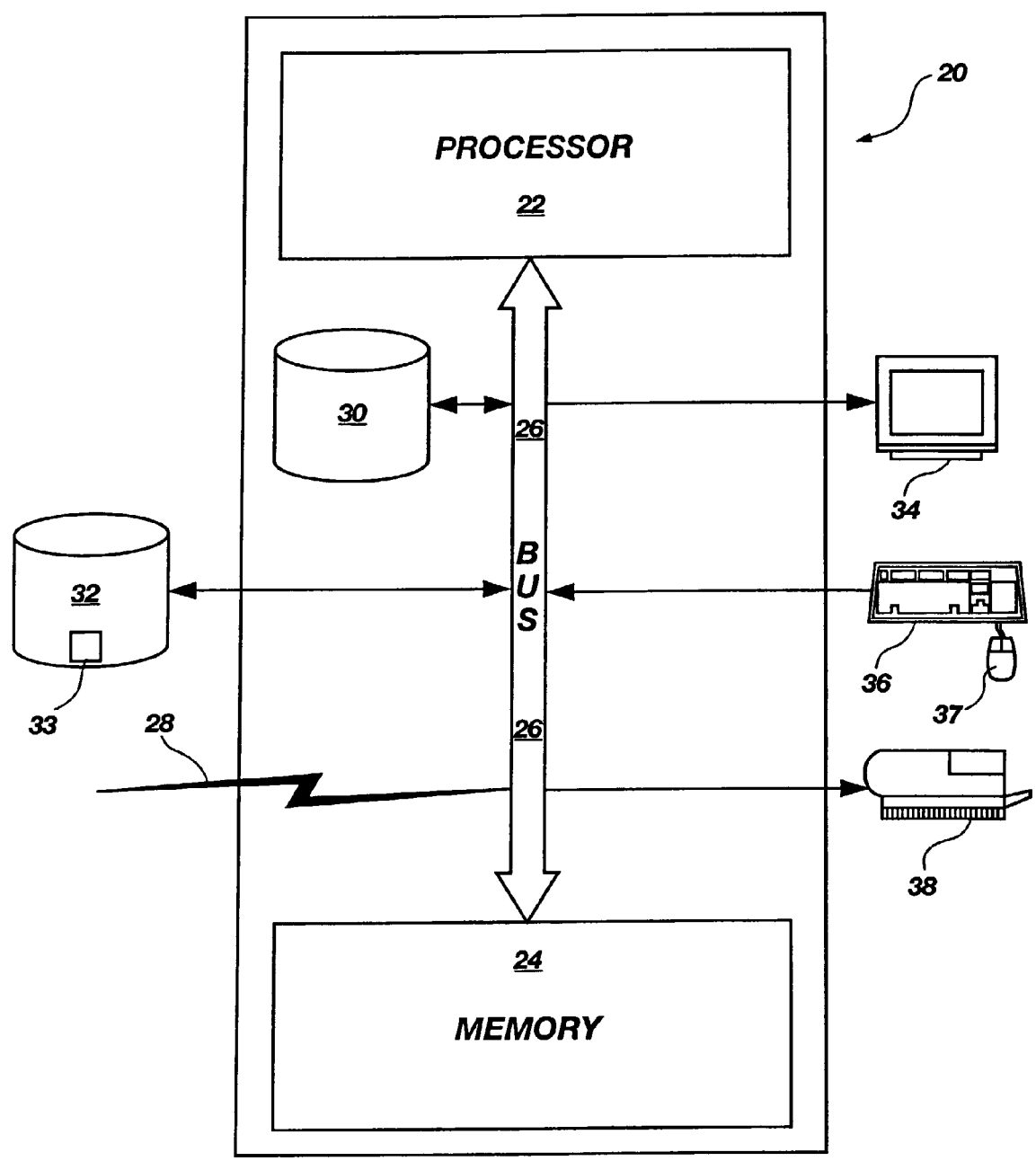
FIG. 3 is a block diagram illustrating an exemplary general purpose computer such as a server shown in FIG. 2.

FIG. 3 is a block diagram illustrating an exemplary general purpose computer 20 such as a server 118 shown in FIG. 2. The general purpose computer 20 has a computer processor 22 and memory 24, connected by a bus 26. Memory 24 is a relatively high-speed, machine-readable medium and includes volatile memories, such as DRAM and SRAM, and nonvolatile memories, such as ROM, FLASH, EPROM, and EEPROM. Also connected to the bus 26 are secondary storage 30, external storage 32, output devices such as a monitor 34, input devices such as a keyboard 36 (with mouse 37), and printers 38. Secondary storage 30 includes machine-readable media such as hard disk drives (or DASD) and disk subsystems. External storage 32 includes machine-readable media such as floppy disks, removable hard drives, magnetic tapes, CD-ROM, and even other computers, possibly connected via a communications line 28. The distinction drawn here between secondary storage 30 and external storage 32 is primarily for convenience in describing the invention. As such, it should be appreciated that there is substantial functional overlap between these elements. Computer software such as printer drivers, operating systems, e-mail servers, directory services, and application programs can be stored in a computer instruction storage medium, such as memory 24, secondary storage 30, or external storage 32. Executable versions of computer software 33 in the form of computer instructions can be read from a computer readable medium such as external storage 32, secondary storage 30, and nonvolatile memory and loaded for execution directly into volatile memory, executed directly out of nonvolatile memory, or stored on the secondary storage 30 prior to loading into volatile memory for execution.

Figure 4:
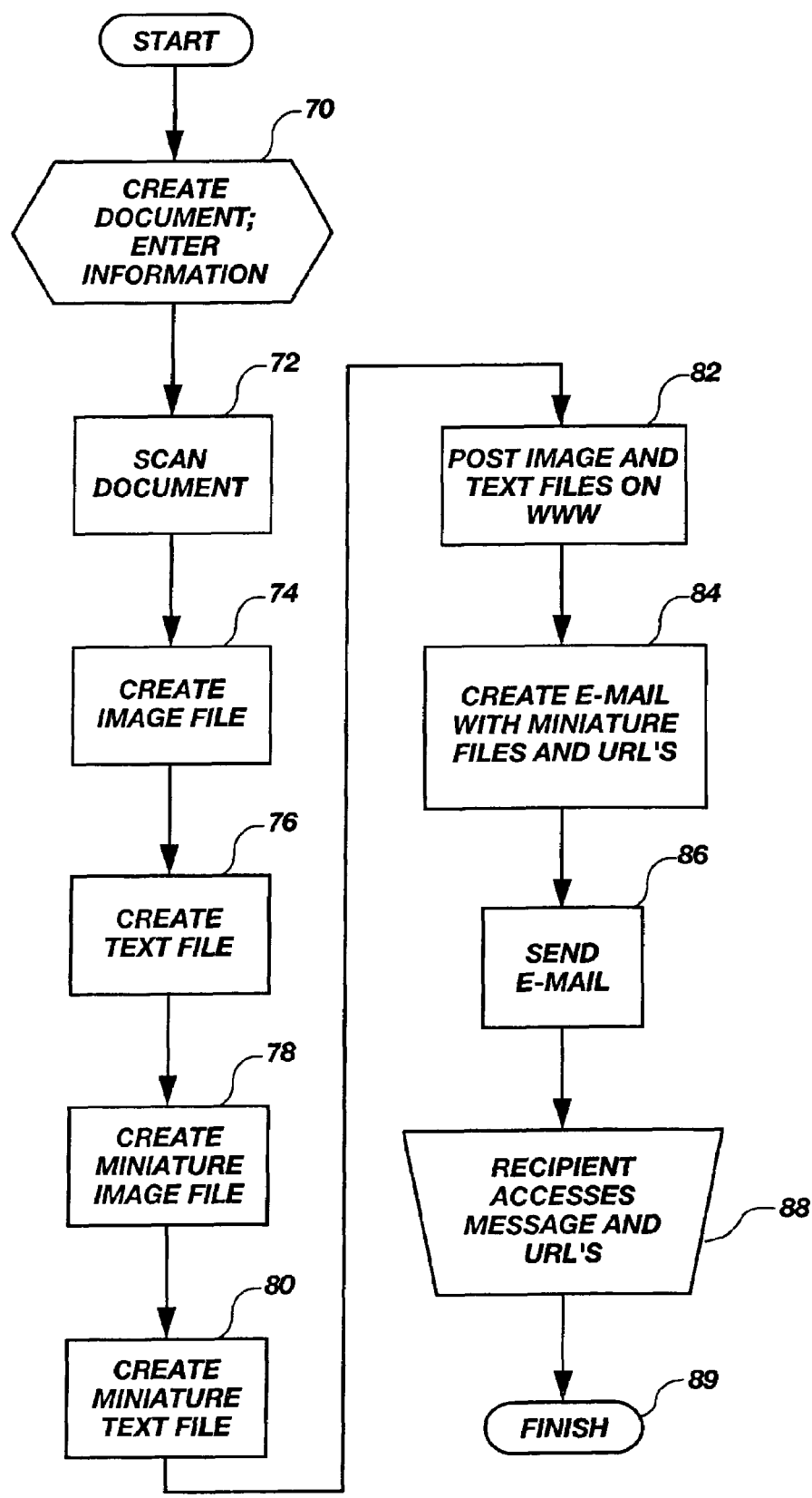
FIG. 4 is a flowchart illustrating operation of an embodiment of the present invention.

FIG. 4 is a flowchart illustrating operation of an embodiment of the present invention. Information for a document is entered and the document is created, step 70. Then, the document is scanned, step 72, into a computer readable format. From the scanned document, an image file is created in a computer readable format such as PDF, TIFF, JPEG, or BMP, step 74. Also created is a text file in a computer readable format such as Word format from Microsoft Corporation, WordPerfect® format from Corel Corporation, ASCII text (TXT), and Rich Text Format (RTF), step 76. This is currently typically done through the use of Optical Character Recognition (OCR) performed on the image file. A miniaturized version of the image file is created, step 78, as well as a miniaturized version of the text file, step 80.

In one embodiment of the present invention, a miniaturized version of an image file is created through the creation of a thumbnail of one or more images in the image file. A thumbnail is a miniaturized version of a view of a document. One current example of such thumbnails is the preview pictures stored under control of the document properties in Office suite programs, such as Word, Excel, PowerPoint®, and Visio®, from Microsoft Corporation. This is illustrative only. Other types of miniaturized versions of views of documents are also within the scope of this invention. One purpose of the miniaturized versions of image files is to provide recipients thereof an indication of what the corresponding image files contain, and therefore provide a mechanism for allowing the recipients to decide whether or not to download the entire image files.

In one embodiment of the present invention, a miniaturized version of the text file is formed by truncating the text file after a specified number of characters or words. Other types of text file truncation and/or miniaturization are also within the scope of this invention. For example, another embodiment utilizes the header or the first section of a text file as a miniaturized version thereof. One purpose of the miniaturized versions of text files is to provide recipients thereof an indication of what the text files contain, and therefore provide a mechanism for allowing the recipients to decide whether or not to download the entire text files.

The full image and text files are then posted on the World Wide Web, step 82. This typically involves storing the files on a World Wide Web server, such as the server 118 shown in FIG. 2. The locations of the full image and text files are formatted as Uniform Resource Locators (URLs). An e-mail message is created with miniaturized or truncated copies of the image file and/or the text files and the URLs to the full image and/or text files, step 84. The e-mail message is then transmitted to the appropriate digital receiving device over the wireless network 116, step 86. Should he wish to, the recipient of the e-mail message can then access the full image and/or text files based on the URLs sent to him in the e-mail message, step 88. The method is then complete, step 89.

The scanning of documents into image files is disclosed above. However, this is one embodiment and is illustrative only. Other methods of providing an image file are also within the scope of the present invention. In another embodiment, an image file is otherwise input into a digital sending device 100. For example, the image file may be the result of receiving a facsimile message. In another embodiment, an image file is already in a computer readable image file format. For example, it may have been created earlier, for example, through using a CAD program such as Visio® from Microsoft Corporation or AutoCAD® from Autodesk, Inc. Alternatively, it may have been created by a graphics program such as Paint from Microsoft Corporation or Photoshop® from Adobe Systems Incorporated.

The posting of both an image file and a text file is disclosed above. This is illustrative only. Other configurations are also within the scope of this invention. Either or both types of files may be posted, with the miniaturization and corresponding URL transmitted in an e-mail message to a recipient.

The scanning of a document, step 72, creation of an image file, step 74, creation of a text file, step 76, creation of a miniaturized version of an image file, step 78, creation of a miniaturized version of a text file, step 80, and transmission of an e-mail message, step 86 are performed from a stand-alone multifunction device acting as a digital sending device 100 in one embodiment of the present invention. This is illustrative only, and other configurations are also within the scope of the present invention. For example, a document may be created in a general purpose computer 20 or received as a facsimile message over a communications link.

A miniaturized version of an image file and/or of a corresponding text file is created. The original or complete versions of these files are typically stored on a server. These miniaturized versions of files are transmitted in e-mail messages across a wireless web interface. Also included in the e-mail messages are URLs addressing the full or complete versions of these files.

This provides an efficient mechanism for indicating to a user of a wireless web device that has limited display area the contents of digitally sent documents. The user can then view miniaturized versions of these digitally sent documents and decide from viewing the miniaturized versions of the documents whether or not to download and view the entire documents. The URLs of the full documents corresponding to the miniaturized versions are included in the e-mail messages in order to allow the user to download and view the entire documents, should he desire to do so.

Those skilled in the art will recognize that modifications and variations can be made without departing from the scope of the invention. Therefore, it is intended that this invention encompass all such variations and modifications as fall within the scope of the appended claims.

What is claimed is:

1. A method, operating in a computing environment, for digital sending electronic files comprising the steps of:
   creating a first image file and a first text file, wherein the first text file is created with optical character recognition based on a portion of the first image file;
   making the first image file and the first text file accessible at a predefined World Wide Web URL address;
   creating miniaturized versions of the first image file and the first text file configured to be viewable on a wireless web-enabled device; and
   automatically creating and sending an electronic message to the wireless web-enabled device that includes the miniaturized versions and a hyperlink to the predefined World Wide Web URL address of the first image file and first the text file.

2. The method in claim 1, further comprising the steps of:
   miniaturizing a second image file and a second text file; and
   including the second miniaturized files in the electronic message.

3. The method in claim 1, further comprising:
   scanning a document to create the first image file.

4. The method in claim 3 further comprising:
   utilizing optical character recognition on the second text file.

5. The method in claim 1, further comprising the step of:
   transmitting the message to a receiving device.

6. The method in claim 1 wherein:
   the step of miniaturizing comprises creating a thumbnails of the first image and text files.

7. The method in claim 1 wherein:
   the step of miniaturizing comprises selecting a portion of the first image and text files to miniaturize.

8. A computer implemented system for digital sending electronic files comprising:
   a scanner configured to create a first image file;
   an optical character recognition processor configured to create a first text file based on a portion of the first image file;
   a transmission module configured to make the first image file and the first text file accessible at a predefined World Wide Web URL address;
   a miniaturization module configured to create miniaturized versions of the first image file and the first text file configured to be viewable on a wireless web-enabled device; and
   an email module configured to create and send an electronic message to the wireless web-enabled device that includes the miniaturized versions and a hyperlink to the predefined World Wide Web URL address of the first image file and first the text file.

9. The system in claim 8 wherein the
   the wireless web-enabled device is a cellular phone.

10. The system in claim 8 wherein:
   the miniaturization module comprise computer instructions for creating a thumbnails of the first image and text files.

11. A computer readable medium containing computer instructions for:
   using a scanner to create a first image file;
   creating a first text file based on a portion of the first image file using optical character recognition;
   sending the first image file and the first text file to a server;
   configuring the server to allow user access to a predefined World Wide Web URL address;
   creating miniaturized versions of the first image file and the first text file configured to be viewable on a wireless web-enabled device, wherein miniaturizing the first image file includes reducing the resolution and size of the first image file and wherein miniaturizing the first text file includes truncating the first text file after specified number of characters or words;
   creating an electronic message that includes the miniaturized versions and a hyperlink to the predefined World Wide Web URL address of the first Image file and first the text file; and
   sending the electronic message to the wireless web-enabled device.

* * * * *